US007000850B2

(12) United States Patent
Lin

(10) Patent No.: US 7,000,850 B2
(45) Date of Patent: Feb. 21, 2006

(54) ANTI-SCALD WATER VALVE ASSEMBLY

(75) Inventor: Pik Fan Lin, Tai Po (HK)

(73) Assignee: Brand New Technology Ltd., Kowloon Bay (HK)

( * ) Notice: Subject to any disclaimer, the term of this patent is extended or adjusted under 35 U.S.C. 154(b) by 0 days.

(21) Appl. No.: 10/832,372

(22) Filed: Apr. 27, 2004

(65) Prior Publication Data
US 2005/0236493 A1 Oct. 27, 2005

(51) Int. Cl.
F16K 31/02 (2006.01)
F16K 17/00 (2006.01)
(52) U.S. Cl. .............. 236/94; 236/93 R; 251/129.22; 137/457; 137/468
(58) Field of Classification Search ............ 236/94, 236/93 R; 251/129.02, 129.15, 129.22, 242; 137/457, 468, 497
See application file for complete search history.

(56) References Cited

U.S. PATENT DOCUMENTS

| 4,842,191 A | * | 6/1989 | Bergmann ............... 236/12.12 |
| 5,024,378 A | * | 6/1991 | Bergmann et al. ........ 236/93 B |
| 5,199,790 A | * | 4/1993 | Pawelzik et al. ........... 374/147 |
| 5,358,177 A | * | 10/1994 | Cashmore ................ 236/12.12 |
| 5,402,815 A | * | 4/1995 | Hoch et al. .................... 137/80 |
| RE35,018 E | * | 8/1995 | Homan .................... 236/12.12 |
| 5,586,722 A | * | 12/1996 | Murray ..................... 236/93 B |
| 5,845,844 A | * | 12/1998 | Zosimodis ............... 236/12.12 |
| 5,944,255 A | * | 8/1999 | Shirmohamadi ......... 236/12.12 |
| 6,105,607 A | * | 8/2000 | Caise et al. .............. 137/487.5 |
| 2005/0072850 A1 | * | 4/2005 | Cornwall et al. ........ 236/12.15 |

* cited by examiner

Primary Examiner—Marc Norman
(74) Attorney, Agent, or Firm—Leydig, Voit & Mayer Ltd.

(57) ABSTRACT

An anti-scald water valve assembly comprises a body including a passage for water, a valve provided in the passage for shutting off the passage, and an electro-mechanical actuator to cause closing of the valve. A temperature sensor senses the temperature of water running through the passage. An electronic operating circuit is connected to the actuator and the sensor for activating the actuator to shut off the passage in response to the sensor sensing the water temperature exceeding a predetermined limit.

11 Claims, 5 Drawing Sheets

ANTI-SCALD WATER VALVE ASSEMBLY

The present invention relates to an anti-scald water valve assembly that will automatically shut off when the water is too hot.

BACKGROUND OF THE INVENTION

Bathroom water temperature is usually controlled by mixing hot and cold water using a mixer tap. The mixer tap is often turned straight to the usual position for the desired temperature or the cold water is first let in followed by hot water gradually. Even after the desired water temperature has been achieved, it often shifts during use especially when a nearby water tap is operated. In any case, while water gets too hot, the user becomes desperate, and this should be avoided especially for children.

The subject invention seeks to mitigate or at least alleviate such a problem by providing an improved water valve assembly.

SUMMARY OF THE INVENTION

According to the invention, there is provided a water valve assembly comprising a body including a passage for water, a valve provided in the passage for shutting off the passage, and an electro-mechanical actuator to cause closing of the valve. A temperature sensor is associated with the passage for sensing the temperature of water running through the passage. An electronic operating circuit is provided in the body and connected to the actuator and the sensor for activating the actuator to shut off the passage in response to the sensor sensing the temperature of water running through the passage exceeding a predetermined limit.

Preferably, the passage comprises a pipe extending through the body.

Preferably, the valve is resiliently biassed by a spring to close and is held open by the actuator.

More preferably, the actuator comprises a solenoid and a core in the solenoid, the core having a part for acting against the spring to hold the valve open.

It is preferred that the valve comprises a valve member located in the pipe and a valve seat provided by a restricted part of the pipe.

It is further preferred that the valve includes an operator for moving the valve member, which are in gear engagement with each other.

In a preferred embodiment, the water valve assembly includes a manual switch for re-opening the valve.

More preferably, the switch is resiliently biassed by a spring for self return.

More preferably, the switch is resiliently biassed by a spring to close the valve.

It is further preferred that the valve is resiliently biassed by the spring to close and is held open by the actuator.

Preferably, the water valve assembly includes control means on the body for controlling the operation of the operating circuit including setting of the predetermined limit.

More preferably, the water valve assembly includes a flow detector provided in the passage for detecting a flow of water through the passage and connected to the operating circuit, the operating circuit being programmed to automatically turn off in the absence of signals from the flow detector and the control means within a predetermined period.

It is preferred that the water valve assembly includes a flow detector provided in the passage for detecting a flow of water through the passage and connected to the operating circuit, the operating circuit being programmed to automatically turn on upon the flow detector detecting a flow.

It is preferred that the water valve assembly includes an audio signal generator provided in the body and connected to the operating circuit for generating an audio alarm upon the operating circuit shutting off the passage.

BRIEF DESCRIPTION OF DRAWINGS

The invention will now be more particularly described, by way of example only, with reference to the accompanying drawings, in which.

DETAILED DESCRIPTION OF BEST MODE EMBODIMENT

Figure 1:
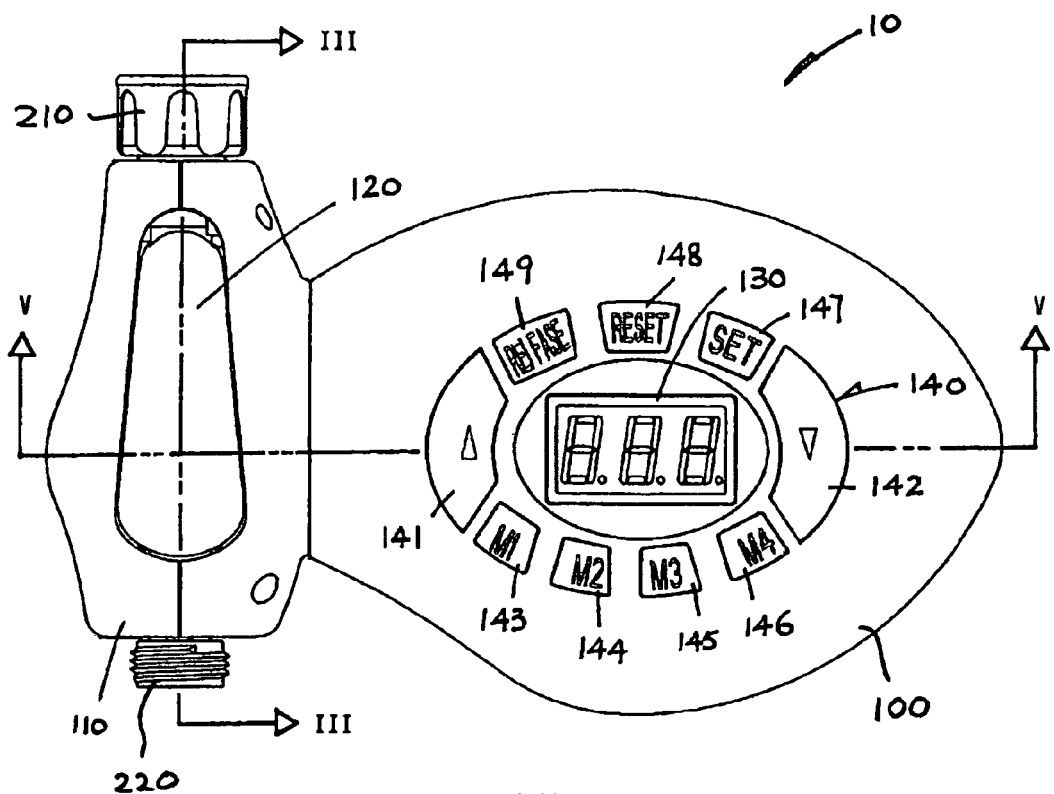
FIG. 1 is a front view of an embodiment of a water valve assembly in accordance with the invention.
Figure 2:
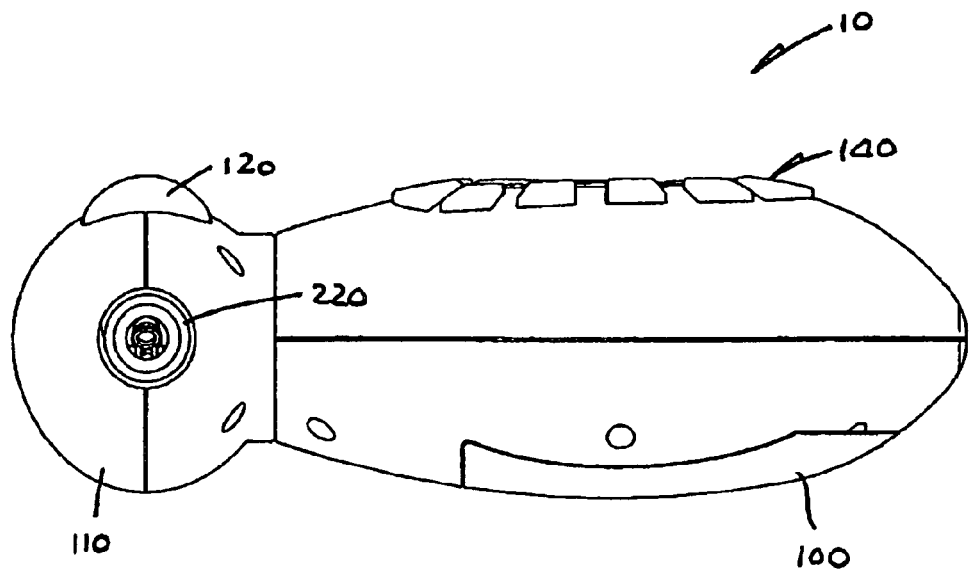
FIG. 2 is a side view of the valve assembly of FIG. 1.

Referring to the drawings, there is shown a water valve assembly 10 embodying the invention for use in a bathroom to stop water that is too hot. The valve assembly 10 is battery operated and includes an oval plastic body 100, a plastic pipe 200 providing a water passage extending transversely through one end 110 of the body 100, and a built-in valve 300 provided at mid-length of the pipe 200. The pipe 200 has an inlet 210 for connection to a water supply fitting downstream of a water heater and an outlet 220 for connection to a showerhead or simply acting as an extension of a water tap above a bathtub to which the inlet 210 is connected.

Inside the pipe 200 and downstream of the valve 300, a flow detector 230 and a temperature sensor 240 (e.g. a thermistor) are installed for detecting flow of water in the pipe 200 and for sensing the water temperature respectively. The detector 230 is implemented by a reel switch 232 located immediately outside the pipe 200 and a magnet 234 supported on a hinged lever 236 inside the pipe 200. The lever 236 is spring-loaded to incline at a downstream acute angle across the pipe 200 and is arranged to be washed aside by water flowing over a certain minimum rate, thereby swinging the magnet 234 close to and thus closing the reel switch 232 to provide a signal indicating that water is running.

The body 100 includes a spring-loaded press knob 120 on its end 110 acting as a manual switch for depression to re-open the valve 300. There is also a control panel on the body 100, which comprises an LED display 130 for displaying water temperature (current or preset as appropriate) and nine keys 140 surrounding the display 130. The keys 140 comprise up and down keys 141 and 142, four memory keys 143 to 146, a set key 147, a reset key 148 and a release key 149. Immediately underneath the control panel, there is mounted an electronic operating circuit 150 on a circuit board, which is connected to the display 130 and keys 140 as well as the reel switch 232 and temperature sensor 240, etc. for co-operation to perform various functions.

Figure 3:
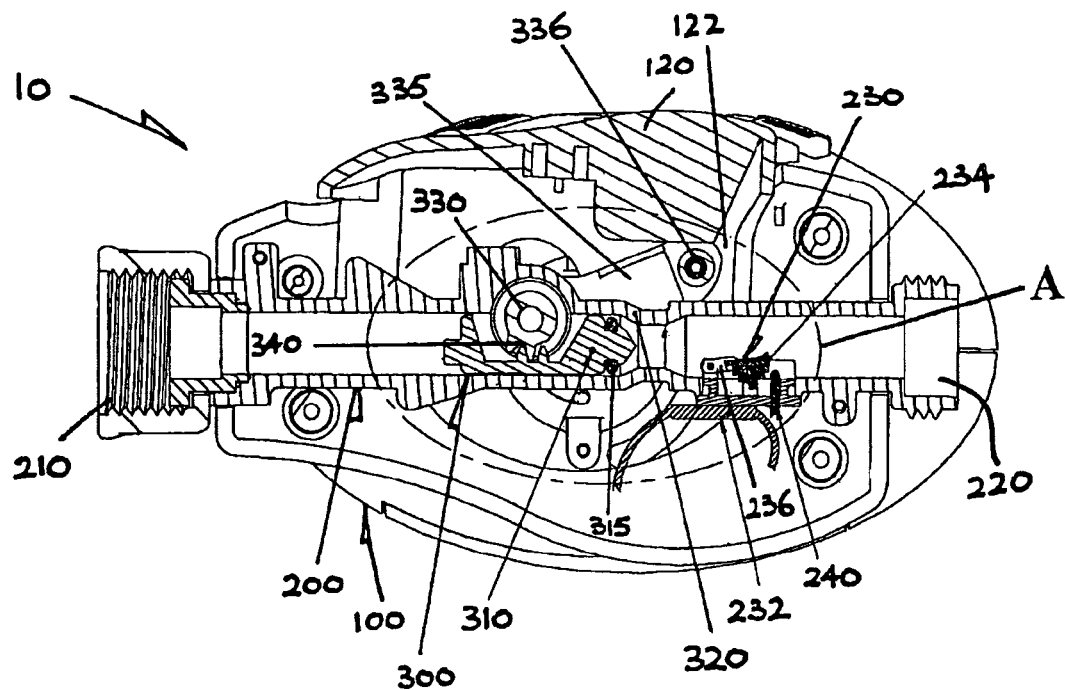
FIG. 3 is a cross-sectional end view of the valve assembly of FIG. 1 taken along line III—III, in an open condition.
Figure 4:
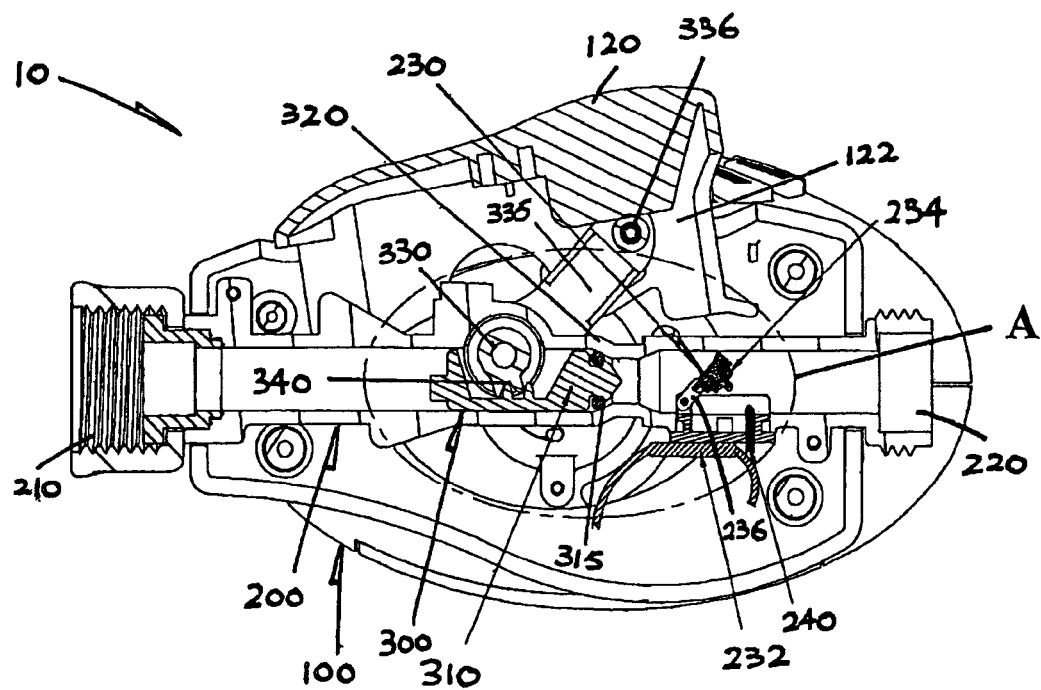
FIG. 4 is a cross-sectional end view of the valve assembly of FIG. 1 taken along line III—III, in a closed condition.
Figure 3A:
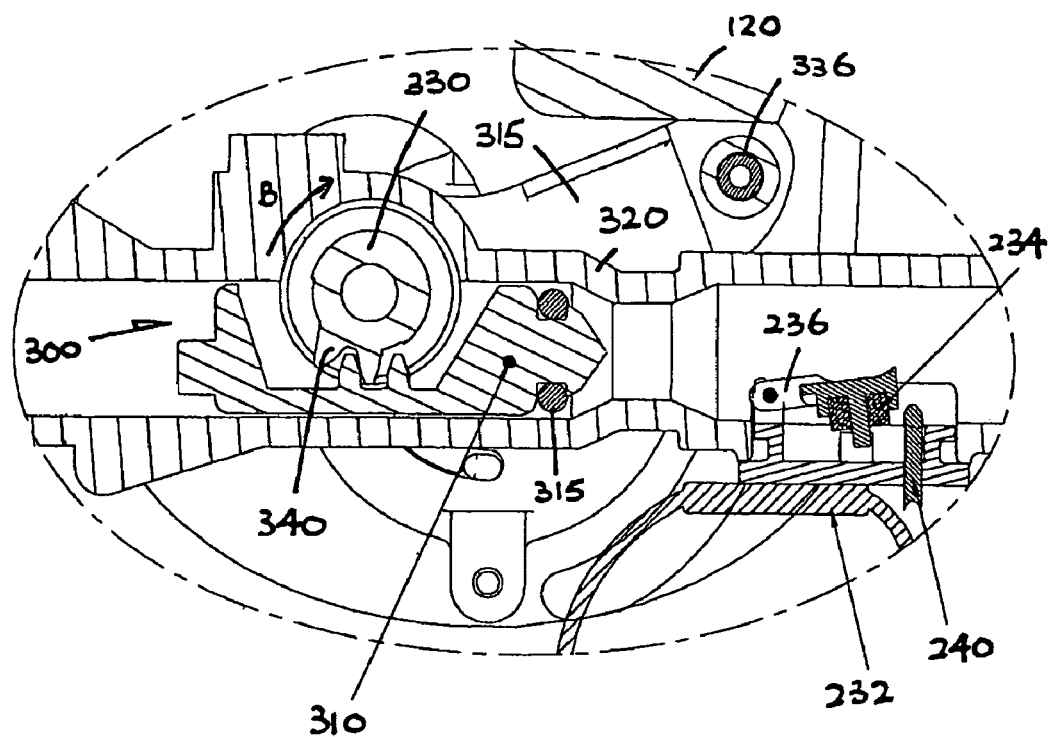
FIG. 3A is an enlarged fragmentary view showing part A of the valve assembly of FIG. 3.
Figure 4A:
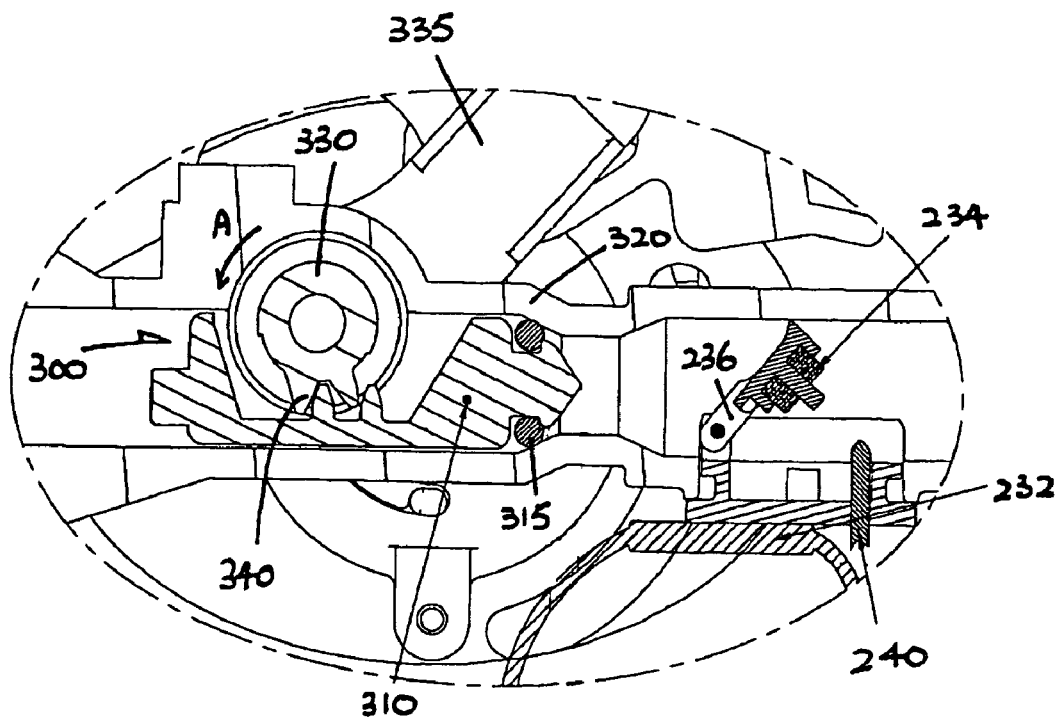
FIG. 4A is an enlarged fragmentary view showing part A of the valve assembly of FIG. 4.

The valve 300 has an elongate valve member 310 extending co-axially inside the pipe 200, which works via an 0-ring 315 with a valve seat 320 provided by a restricted part of the pipe 200. The valve member 310 has an X-shaped cross-section behind the O-ring 315 for water to pass. It is slidable by an operating shaft 330, which extends from one side into the pipe 200, through inter-engaging gear teeth 340. The valve member 310 will seal with the seat 320 upon the shaft 330 turning in direction A (FIG. 4A), and will depart from the seat 320 as the shaft 330 turns in the opposite direction B (FIG. 3A).

A radial arm 335 of the shaft 330 has a cross pin 336 at its free end, whose opposite ends engage slidably with respective slots (not shown) on opposite side walls 122 of the press knob 120, such that the press knob 120 will upon pivoting turn the shaft 330 to operate the valve 300. The press knob 120 is resiliently biassed for self return to a normally raised position to close the valve 300 (FIG. 4) and will, upon depression, open the valve 300 (FIG. 3).

Figure 5:
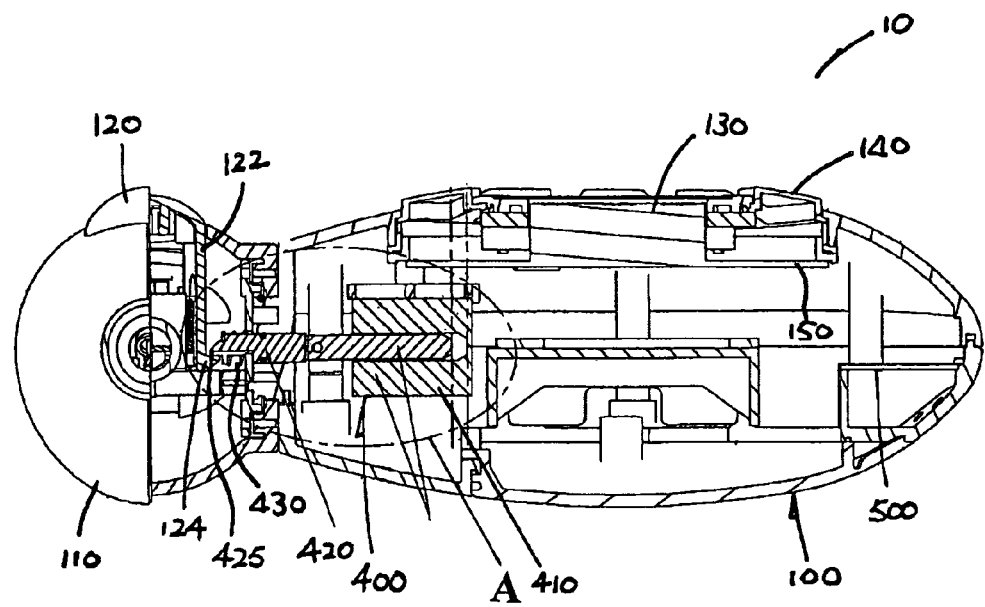
FIG. 5 is a cross-sectional side view of the valve assembly of FIG. 1 taken along line V—V, in an open condition.
Figure 6:
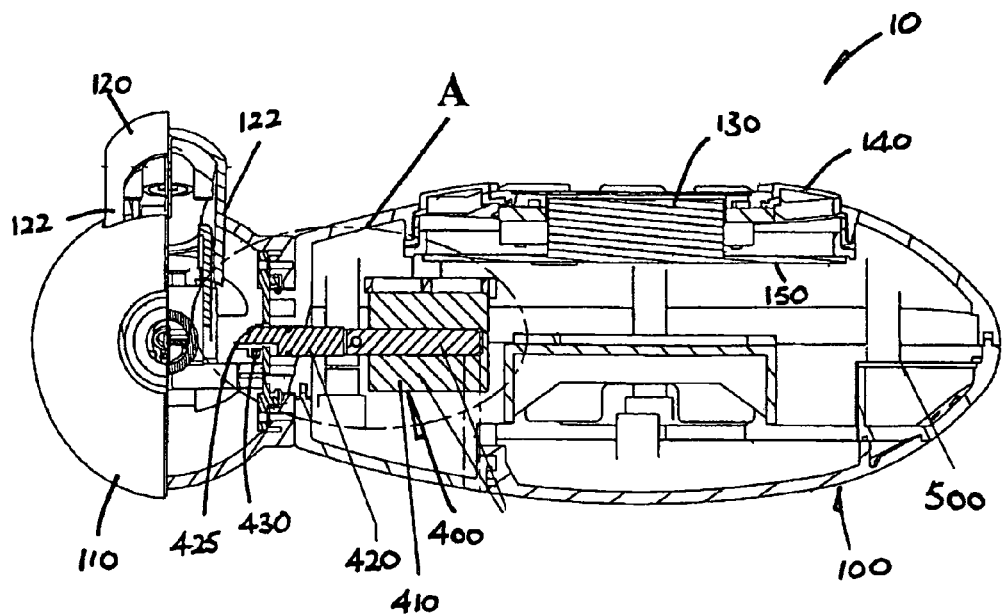
FIG. 6 is a cross-sectional side view of the valve assembly of FIG. 1 taken along line V—V, in a closed condition.
Figure 5A:
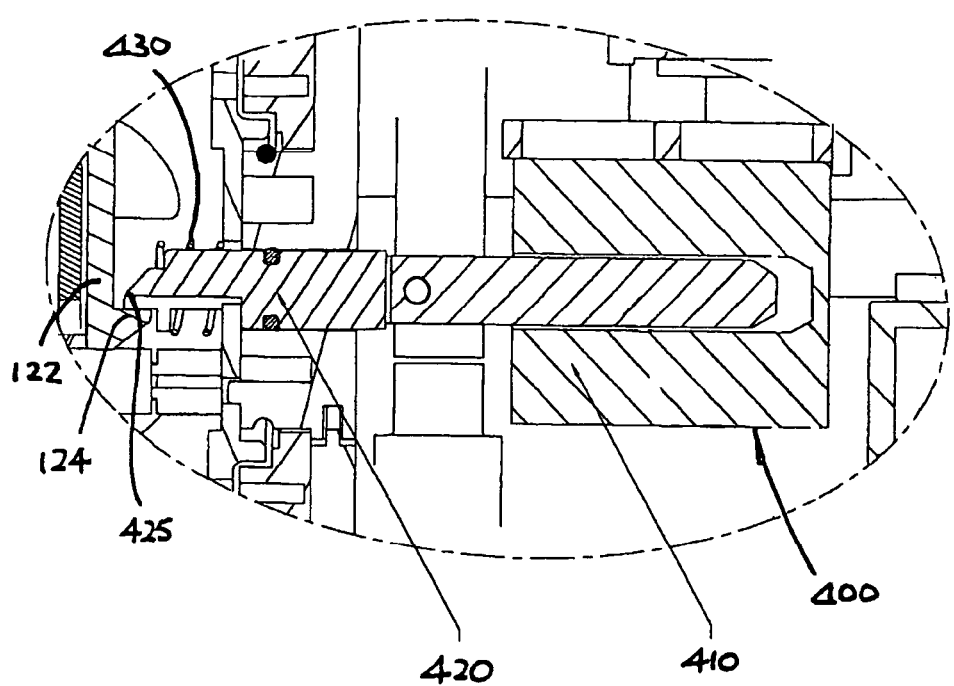
FIG. 5A is an enlarged fragmentary view showing part A of the valve assembly of FIG. 5.
Figure 6A:
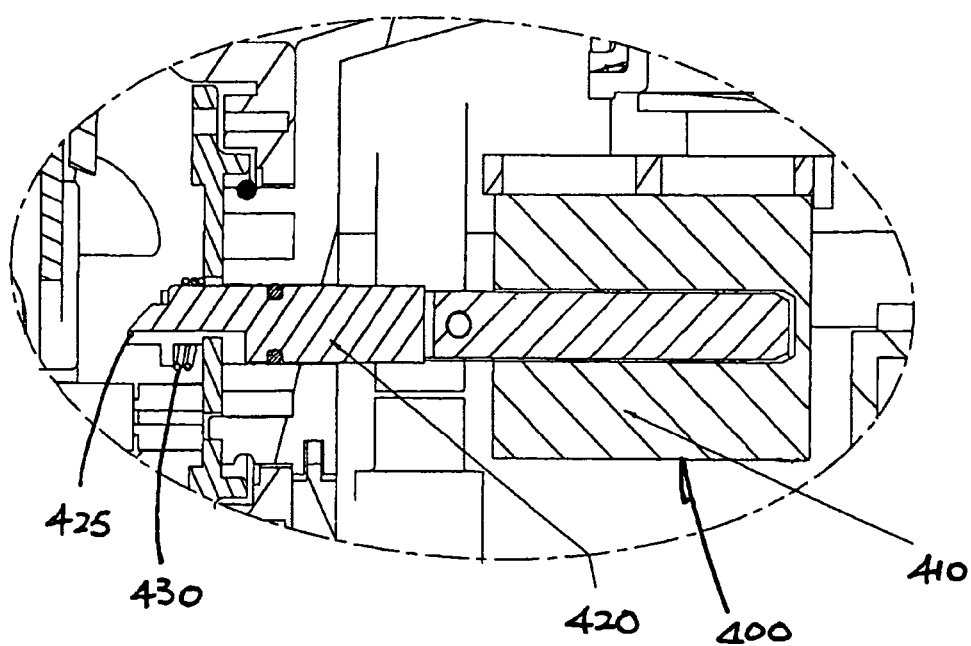
FIG. 6A is an enlarged fragmentary view showing part A of the valve assembly of FIG. 6.

In the depressed position, the press knob 120 is held down by an electro-mechanical actuating latch 400 (FIG. 5) on its inner side. The latch 400 is formed by a solenoid 410 and a movable core pin 420 therein. The pin 420 is biassed outwards by an associated coil spring 430 to have its tip 425 engaging a bottom hook 124 of the press knob 120 (FIG. 5A), thereby holding the knob 120 down to keep the valve 300 open. Upon energization of the solenoid 410, the pin 420 will be drawn inwards (FIG. 6A) to thereby release the knob 120, which is then sprung upwards to close the valve 300.

The main function of the operating circuit 150 is to shut off the valve 300 by energizing the latch 400 upon the temperature sensor 240 sensing the temperature of water running through the pipe 200 exceeding a preset threshold limit. The threshold can be set by using the up and down keys 141 and 142 for adjustment in the range from 27° C. to 45° C. and then the set key 147 for confirmation. The desired temperature can be saved to one of the memory keys 143 to 146 to meet individual needs, in which case the relevant memory key should first be pressed. The preset temperature can be selected by pressing the appropriate memory key, or be recalled for display by momentarily pressing the set key 147. The reset key 148 restores all settings to factory values.

The set key 147 also acts as a power key for turning on the operating circuit 150 from a stand-by mode for use and, upon prolonged depression, for turning it off. In normal use, the circuit 150 will automatically turn on as soon as water is running as detected by the flow detector 230. The circuit 150 is also programmed to automatically turn off to the stand-by mode when there are no signals from the flow detector 230 (i.e. no water flow through the pipe 200) and the keys 140 (i.e. none of them pressed) within a predetermined period e.g. one minute.

While the valve assembly 10 is in use and water is running, the water temperature as sensed by the sensor 240 will be displayed. Upon the temperature rising above the preset threshold, the operating circuit 150 will trigger the latch 400 to close the valve 300, thereby shutting off the pipe 200 and hence stopping the water, followed by a beeping alarm given by a piezo-electric buzzer 500.

Before the valve assembly 10 is re-activated, the relevant water heater or mixer tap should be adjusted to supply water at a reduced temperature below the threshold limit. The valve assembly 10 is activated by firstly pressing the release key 149 to de-energize the solenoid 410 to in turn release the latch pin 420. Then, the press knob 120 should be pressed, and thus locked down by the latch pin 420, to re-open the valve 300 for resuming running of water at a safe temperature.

The invention has been given by way of example only, and various other modifications and/or variations to the described embodiments may be made by persons skilled in the art without departing from the scope of the invention as specified in the accompanying claims.

What is claimed is:

1. A water valve assembly comprising:
    a body including a passage for water, wherein the passage comprises a pipe extending through the body;
    a valve provided in the passage for shutting off the passage, wherein the valve comprises a valve member located in the pipe, a valve seat provided by a restricted part of the pipe, and an operator for moving the valve member, wherein the operator and the valve member are in gear engagement with each other;
    an electro-mechanical actuator to cause closing of the valve;
    a temperature sensor associated with the passage for sensing the temperature of water running through the passage; and
    an electronic operating circuit provided in the body and connected to the actuator and the sensor for activating the actuator to shut off the passage in response to the sensor sensing the temperature of water running through the passage exceeding a predetermined limit.

2. The water valve assembly as claimed in claim 1, wherein the valve is resiliently biased by a spring to close and is held open by the actuator.

3. The water valve assembly as claimed in claim 2, wherein the actuator comprises a solenoid and a core in the solenoid, the core having a part for acting against the spring to hold the valve open.

4. The water valve assembly as claimed in claim 1, including a manual switch for re-opening the valve.

5. The water valve assembly as claimed in claim 4, wherein the switch is resiliently biassed by a spring for self return.

6. The water valve assembly as claimed in claim 4, wherein the switch is resiliently biassed by a spring to close the valve.

7. The water valve assembly as claimed in claim 6, wherein the valve is resiliently biassed by the spring to close and is held open by the actuator.

8. The water valve assembly as claimed in claim 1, including control means on the body for controlling the operation of the operating circuit including setting of the predetermined limit.

9. The water valve assembly as claimed in claim 8, including a flow detector provided in the passage for detecting a flow of water through the passage and connected to the operating circuit, the operating circuit being programmed to automatically turn off in the absence of signals from the flow detector and the control means within a predetermined period.

10. The water valve assembly as claimed in claim 1, including a flow detector provided in the passage for detecting a flow of water through the passage and connected to the operating circuit, the operating circuit being programmed to automatically turn on upon the flow detector detecting a flow.

11. The water valve assembly as claimed in claim 1, including an audio signal generator provided in the body and connected to the operating circuit for generating an audio alarm upon the operating circuit shutting off the passage.

* * * * *